April 5, 1949.　　　　　N. F. FONER　　　　　2,466,222
SNOW BIKE
Filed Jan. 3, 1947
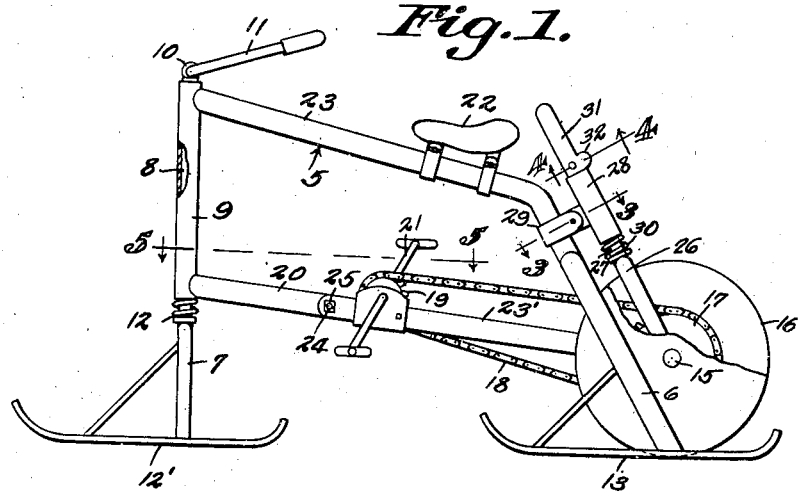
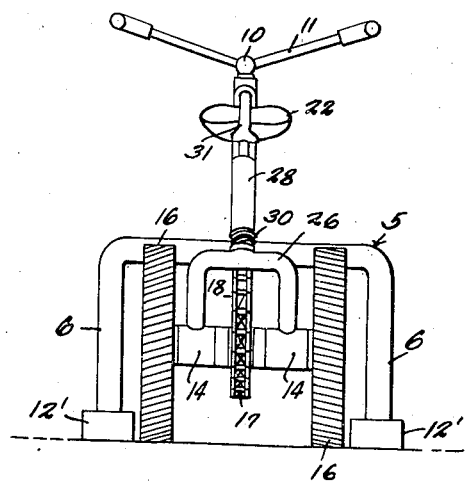
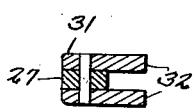
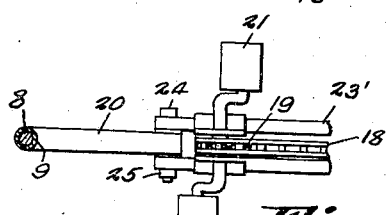
Inventor
N. F. Foner
By C. A. Snow Co.
Attorneys.

Patented Apr. 5, 1949

2,466,222

UNITED STATES PATENT OFFICE 2,466,222

SNOW BIKE

Newton F. Foner, Pittsburgh, Pa.

Application January 3, 1947, Serial No. 720,092

1 Claim. (Cl. 280—12.14)

This invention relates to snow bicycles and aims to provide a snow bicycle which may be used as a coaster, or may be used as a propelled bicycle, the device being provided with traction means which is operated by foot pedals to propel the bicycle over a snowy or icy surface.

An important object of the invention is to provide a device of this character wherein the propelling wheel may be readily and easily moved into and out of contact with the surface over which the bicycle is moved, so that the bicycle may be converted into a coaster or a propelled vehicle, at the will of the operator.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is a side elevational view of a propelled bicycle, constructed in accordance with the invention.

Figure 2 is a rear elevational view thereof.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Referring to the drawings in detail, the frame of the machine is indicated generally by the reference character 5 and comprises the rear fork 6 and front fork 7, the front fork 7 being provided with a shank 8 that extends through the head 9 of the frame, the upper end of the shank 8 being provided with a socket member 10 through which the handles 11 extend, and to which the handles are secured. As shown, the shank 8 is of a length greater than the head 9 so that a space is provided between the lower end of the head 9 and fork 7, there being provided a coiled spring 12 disposed between the lower end of the head 9 and fork 7 yieldingly supporting the front fork of the device.

The reference character 12' indicates runners to which the front fork 7 is secured.

Runners 13 are secured to the rear fork 6 of the bar 23 forming a part of the frame, the bar 23 extending rearwardly from the head 9, the rear end of the bar providing a support for the fork 26 and the axle 15 on which the traction wheels 16 are mounted to rotate therewith.

Secured to the axle, is the sprocket 17 over which the chain 18 operates, the chain also operating over the sprocket 19 mounted in bearings secured to the bar 20 of the frame of the device. The sprocket 19 is operated by means of the pedals 21 which are disposed directly under the operator's seat 22 mounted on the bar 23 of the frame of the bicycle. The bar 20 includes a rear section 23' which has pivotal connection with the section 20 at 24, the connection being such that the section 23' may be adjusted with respect to the section 20 and the sections secured together against pivotal movement, by means of the nut 25.

The axle 15 is mounted in bearings 14 formed on the fork 26 which has a shank 27 that moves within the tubular bearing 28, the tubular bearing 28 being pivotally connected with the frame of the bicycle, by means of the strap 29. A coiled spring 30 is positioned on the shank 27 and is disposed between the lower end of the bearing 28 and upper portion of the fork 26, normally urging the fork downwardly.

At the upper end of the shank 27 is a pivoted lever 31 which is formed with an offset portion 32 adapted to move over the upper edge of the tubular bearing 28 to move the fork 26 upwardly when it is desired to raise the traction wheels 16 to disengage the surface over which the bicycle is moving. The fork 26 may be moved downwardly so that the wheels 16 are in contact with the surface, by moving the lever upwardly to the position shown by Fig. 1.

What is claimed is:

A snow vehicle comprising a frame, front and rear forks mounted on the frame, runners mounted at the free ends of the forks, a tubular bearing member, clamping means for clamping the tubular bearing member to the frame adjacent to the rear fork, a traction wheel fork having bearings at its free ends, said traction wheel fork including a shank mounted for sliding movement within the tubular bearing, an axle mounted within the bearings of the fork, traction wheels secured to the axle, a coiled spring disposed between the wheel fork and lower end of the tubular bearing member, normally urging the wheel fork and traction wheels downwardly, a lever for moving the traction wheels out of contact with the ground surface against the action of the coiled spring, and means for transmitting movement to the axle and traction wheels.

NEWTON F. FONER.

REFERENCES CITED

The following references are of record in the file of this patent:

UNITED STATES PATENTS

| Number | Name | Date |
|---|---|---|
| 467,737 | Guethler et al. | Jan. 26, 1892 |
| 576,512 | Tucker | Feb. 2, 1897 |
| 828,130 | Lehman | Aug. 7, 1906 |
| 1,070,159 | Mercer | Aug. 12, 1913 |